United States Patent [19]

Ogura

[11] Patent Number: 4,479,907
[45] Date of Patent: Oct. 30, 1984

[54] METHOD OF AND APPARATUS FOR PRODUCING HIGHLY HUMID AIR

[76] Inventor: Takashi Ogura, 5-15, Inagehigashi 3-chome, Chiba-shi, Chiba, Japan, 281

[21] Appl. No.: 522,729

[22] Filed: Aug. 12, 1983

[30] Foreign Application Priority Data

Aug. 19, 1982 [JP] Japan .................................. 57-143865

[51] Int. Cl.³ .......................................... F02M 25/02
[52] U.S. Cl. .............................. 261/18 A; 123/25 A; 123/25 L; 261/64 R; 261/6
[58] Field of Search .................. 261/18 A; 123/25 A, 123/25 L

[56] References Cited

U.S. PATENT DOCUMENTS

| | | | |
|---|---|---|---|
| 1,275,379 | 8/1918 | Bushey | 261/18 A |
| 1,610,508 | 12/1926 | Foley | 123/25 A |
| 2,676,577 | 4/1954 | Vanderpoel | 261/18 A |
| 2,687,120 | 8/1954 | Malec | 261/18 A |
| 2,756,729 | 7/1956 | Wolcott | 123/25 L |
| 3,856,901 | 12/1974 | Neumann et al. | 261/18 A |
| 4,191,134 | 3/1980 | Goodman | 261/18 A |
| 4,336,772 | 6/1982 | Young | 261/18 A |
| 4,391,229 | 7/1983 | Turner | 123/25 L |

FOREIGN PATENT DOCUMENTS 1098947 4/1955 France ............................. 123/25 A

*Primary Examiner*—Tim Miles
*Attorney, Agent, or Firm*—Wenderoth, Lind & Ponack

[57] ABSTRACT

The method and apparatus make use of the suction source which, for example, is developed in the automobile engine, and produce a vapor-and-air mixture that contains large amounts of high humidity, which is to be added to the air-and-fuel mixture, thereby enhancing the mixture ratio to a higher value than the theoretical air-and-fuel mixture. Thus, the complete combustion can be achieved, thereby improving the fuel economy and the air pollution problem.

8 Claims, 4 Drawing Figures

METHOD OF AND APPARATUS FOR PRODUCING HIGHLY HUMID AIR

BACKGROUND OF THE INVENTION

1. Field of the Invention

The present invention relates generally to the field associated with the internal combustion engine for the automotive vehicles or other fuel combustion organs. More particularly, the present invention provides means of improving the fuel economy as well as reducing the quantities of the harmful gases from the engine or organ, by producing a water vapor by means of the vaporization process, mixing it with an appropriate amount of air to form a highly humid air, and adding it to the usual air-and-fuel mixture, thereby increasing the air-and-fuel mixture to a higher ratio such as 1:19.

2. Description of the Prior Art

The conventional method that produces a highly humid air usually consists of causing a jet of water to be produced through a water jet nozzle and mixing it with air to form a vapor-and-air mixture. By using this method, the jet of water contains gross particles of water, which causes the vapor-and-air mixture distribution to be non-uniform. In addition, the mixture containing the particles of water that are relatively large prevents those water particles from decomposing into oxygen and hydrogen satisfactorily, when it is burned at high temperatures in the engine. This problem has the accompanying disadvantage in that it makes it impossible to improve the proportion of the fuel in the air-and-fuel mixture. Furthermore, the above method provides no satisfactory means of reducing the amount of harmful substances contained in the exhaust gases from the engine.

SUMMARY OF THE INVENTION

The present invention is provided to eliminate the above described problems and disadvantages inherent in the prior art method and apparatus.

Accordingly, a principal object of the present invention is to provide an improved means of saving the fuel to be consumed in the engine or other organs and of reducing the quantities of the harmful gases exhausted from the engine, etc.

Another object of the present invention is to provide a method of producing a highly humid air which is to be added to the usual air-and-fuel mixture, thereby enhancing its mixture ratio up to the level that permits the complete combustion of the fuel.

A further object of the present invention is to provide an apparatus which is constructed to supply a highly humid air by making use of the suction source that is developed in the engine, for example.

In accordance with the present invention, when water is drawn by suction through a very finely apertured nozzle, it is formed to very fine particles of water under the reduced pressure vaporization, which are mixed with a stream of air to form a uniformly distributed vapor-and-air mixture. By making use of the suction source in the engine, the vapor-and-air mixture is drawn into the air-and-fuel mixture suction pipe of the engine, where the first mixture is added to the latter mixture to be introduced into the combustion chamber of the engine cylinder.

BRIEF DESCRIPTION OF THE DRAWINGS

Those and other objects and advantages of the present invention will become apparent from the detailed description of several preferred embodiments that follow hereinafter with an aid of the accompanying drawings, in which.

DETAILS OF THE PREFERRED EMBODIMENTS

Referring now to the accompanying drawings, a typical embodiment of the present invention is described in detail. In the typical application in which the present invention is used for providing an improved air-to-fuel mixture ratio for the engine, etc., the construction of the apparatus shown in FIG. 1 has an outlet to be coupled with the suction pipe of the engine, and the air stream containing a high proportion of moisture, which is produced in the above apparatus, is drawn by suction through the outlet into the suction pipe and then into the engine cylinder chamber.

For the ease and simplicity of understanding the construction of the apparatus, the following description is presented in conjunction with the application in which the present invention is to be used for the purpose of improving the air-to-fuel mixture ratio or fuel economy of the engine. It should be understood, however, that the harmful gas preventive means can also be provided by the construction to be described below.

Figure 1:
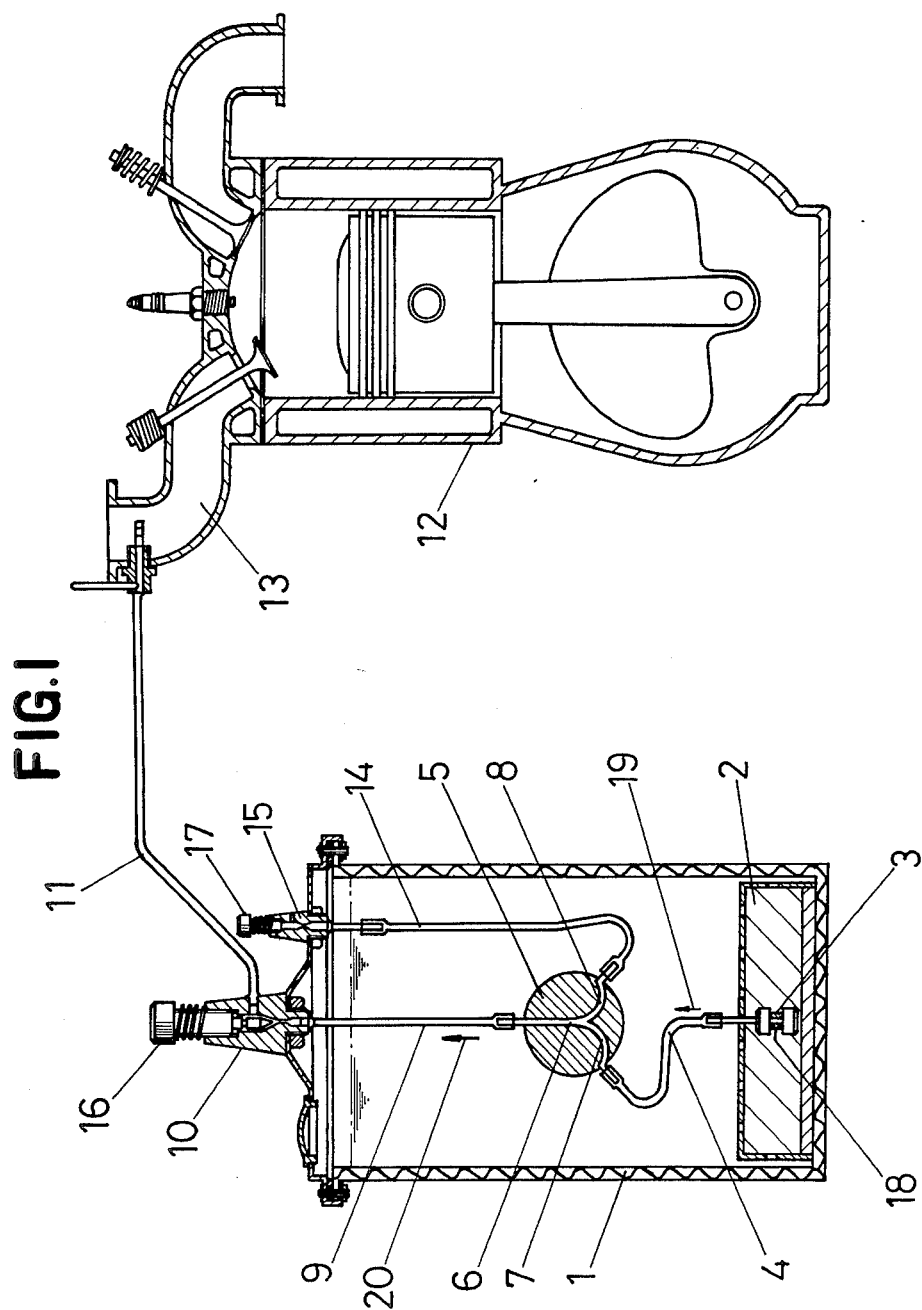
FIG. 1 is a partly sectional view, as seen from the front side, of a preferred embodiment of the apparatus according to the present invention, which is principally designed to provide an improved engine fuel economy.

In FIG. 1, a container 1 which contains water at temperatures of 15° to 50° C. is enclosed by thermal insulating side and bottom walls, and includes a filter medium or bed 2 on the bottom inside, the filter medium 2 containing a suction nozzle 3 which is embedded therein and to which one end of a narrow vaporization pipe 4 of a diameter of 1 mm is connected. Within the water container 1, an element 5 in the form of a globe is provided in the central space and is fixed in position. The element 5 is a convergent point at which two different flows meet, forming together a single flow. Structurally, the element 5 includes a suction passage 6 of a diameter of 2 mm which extend deep into it, and two suction passages 7 and 8 each of a diameter of 1 mm which also extend deep into the globe 5. The three suction passages meet together at the center of the globe at acute angles such as 10 degrees relative to each other. The exposed end of the passage 6 which is located outside the element 5 is coupled with one end of a narrow vapor-and-air mixture pipe 9 of a 2 mm diameter, the other end of which is connected to one end of a 2 mm-diameter connecting pipe 11 through an intermediate regulator valve 10. The other end of the connecting pipe 11 extends through the side wall of an air-and-fuel mixture suction pipe 13 from an engine 12, and is fixed to the suction pipe 13. As shown, the above other end of the connecting pipe 11 is located inside the suction pipe 13. The exposed end of the suction passage 7 which is located outside the globe 5 is coupled with the other end of the aforementioned narrow water vaporization pipe 4, and the exposed end of the suction passage 8 which is located outside the globe 5 is coupled with one end of a 1 mm-diameter narrow air supply pipe 14, the other end of which is connected to a regulator valve 15. In FIG. 1, reference numerals 16 and 17 denotes valve stems for the valves 10 and 15, respectively. The suction nozzle 3 has intake apertures 18 of 0.1 mm diameter through which water is forced to be drawn by suction through the nozzle 3 into the vaporization pipe 4.

In the above described embodiment, starting the engine 12 reduces the internal pressure within the suction pipe 13, such as down to the atmospheric pressure in the range of 200 mm Hg and 700 mm Hg, preferably 400 mm Hg. The reduced pressure that has been developed within the engine or suction pipe 13 is transmitted through the connecting pipe 11 into the vaporization pipe 4, which is also placed under the reduced pressure. This is followed by the reduced pressure that occurs in the vaporization pipe 4, the suction that is developed there attracting the water through the intake apertures 18 into the vaporization pipe 4. The intake apartures 18, which are formed with very fine apertures of 0.1 mm diameter, can vaporize or reduce the water into fine particles immediately as the water is being introduced through the apertures 18 under the action of the force of the suction. The fine particles of the water are then forced to be drawn through the passage 4 in the direction of an arrow 19 and then through the suction passage 7 into the converging passage 6. While the above flow of the water particles is taking place, a stream of air from the narrow air feed pipe 14 is also introduced by suction into the suction passage 8 which meets the suction passage 7 and suction passage 6 at the acute angles relative to each other. At the meeting point within the globe element 5, the two different flows of the fine particles of water and air stream meet together, forming a mixture of the water particles and air. The mixture, which is in the form of a jet of a spray, is forced by suction to flow through the passage 6 into the pipe 9 as indicated by an arrow 20, and then through the regulator valve 10 into the connecting pipe 11. Finally, the water vapor-and-air mixture enters into the engine suction pipe 13 from the connecting pipe 11.

The theoretical air-and-fuel mixture ratio requirements for the optimum engine operation has a ratio of 1 to 15. When the engine is operating in this optimum conditions, however, a slight incomplete combustion still occurs in the engine, which produces the exhaust gases that contain large amounts of harmful substances such as CO, HC, and NOX. This causes the air pollution as well as a drop in the fuel economy or fuel efficiency. Although those problems have been targets for solution by many researchers, practically no satisfactory solutions have yet been arrived at. Then alternative means of reducing the amount of the harmful substances (such as the secondary combustion, separation of the harmful substances by the use of catalysts, etc.) have been sought and actually employed at the expence of reducing the engine power output. A further alternative solution has been sought, in which a change in the optimum air-to-fuel ratio of 1 to 15 is suggested to increase the proportion of air relative to the fuel by the addition of the dry air. The use of this solution causes a decrease in the relative amounts of the gaseous elements such as oxygen and hydrogen that are required to fire the fuel, the decrease occurring to such a degree that those elements become insufficient to cause a fire to fail. This solution also causes a decrease in the required amount of humidity, which causes a drop in the temperature within the combustion chamber, resulting in a sudden loss in the vehicle speed. For the above reasons, this solution does not meet the practical needs.

The present invention provides a solution to the above problem by forming water into a jet of fine particles and then combining it with a stream of air to form a vapor-and-air mixture which contains a high proportion of humidity. According to the present invention, the solution consists of then introducing the vapor-and-air mixture flow into the air-fuel mixture suction pipe. Adding the vapor-and-air stream to the air-fuel mixture in the engine suction pipe in this manner can considerably enhance the air-and-fuel mixture ratio. The molecules contained in the water in its fine particle form can readily decompose into oxygen and hydrogen. Upon contact with the high temperature within the engine, the molecules of the water immediately decompose to the elements, helping the fuel to be burned completely. In the above case, the air-and-fuel mixture ratio can be increased to 1:19, which indicates an increase of 4% from the thearetical air-and-fuel mixture ratio. This accounts for an increase of the fuel saving rate to about 36.7%.

The running tests were carried out for cars with the above described device installed, and the results showed that a saving of the fuel consumption by 30% to 50% could be achieved. The above results were obtained by testing the commercial cars with the engine capacity of 2,000 cc which were running under the different running conditions. Therefore, the saving of the fuel consumption that could be attained varied in the range of 30% and 50% as indicated, depending on the different running conditions, but none of the cars tested caused the fuel saving to fall below 30%. Accordingly, it has been demonstrated that the method and apparatus proposed by the present invention are effective even for the worst running situation where the car is to be started and stopped over again under the low-gear or slow driving condition. Generally, it is known that increasing the air-and-fuel mixture ratio for running the engine causes a rapid drop in the quantities of HC and CO contained in the exhaust gases while causing an increase in the quantity of NOX (see FIG. 2).

Figure 2:
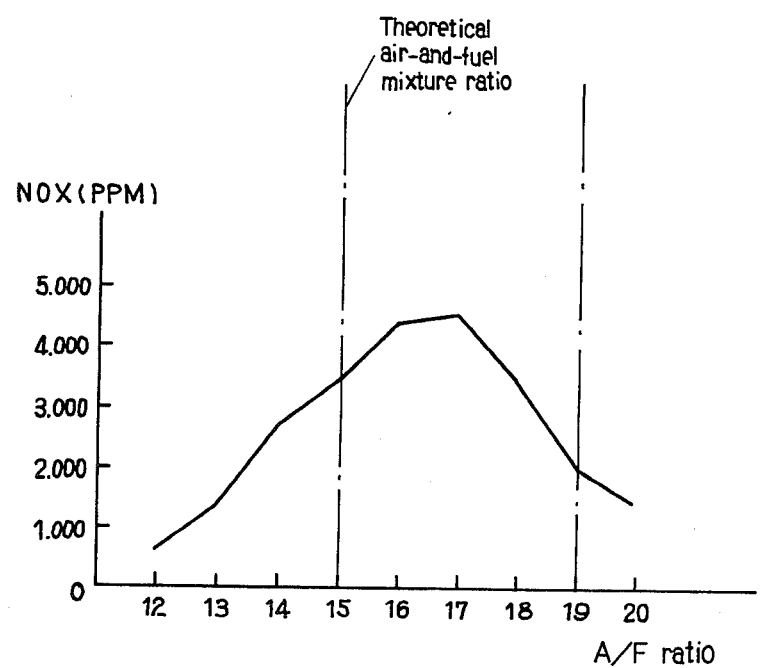
FIG. 2 is a graphical representation of the relationship between the varying air-to-fuel mixture ratios and the changes in the amount of NOX contained in the engine exhaust gases.
Figure 3:
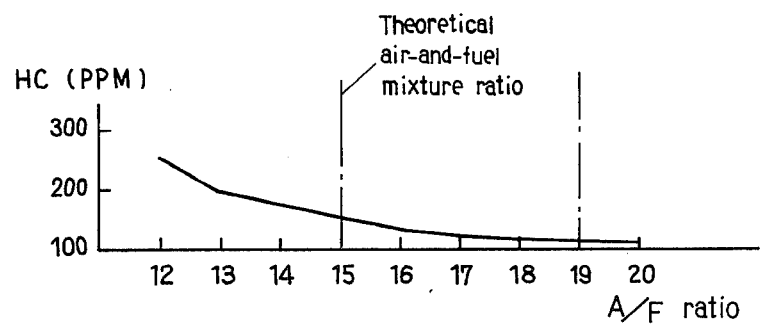
FIG. 3 is a similar graphical representation of the relationship between the air-to-fuel mixture ratio and the resulting amount of HC.
Figure 4:
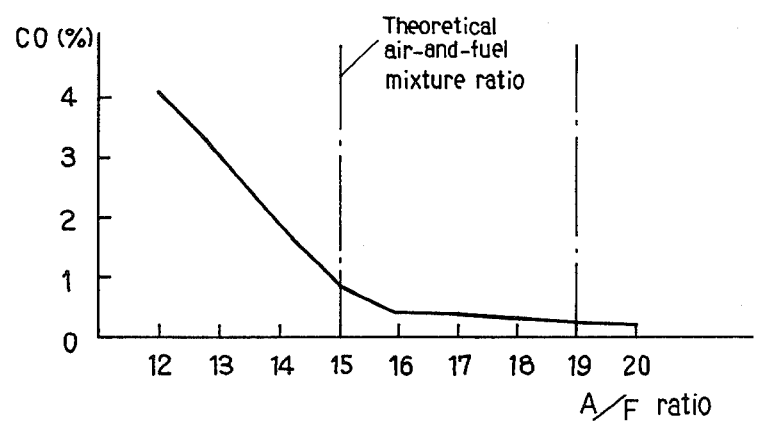
FIG. 4 is a similar graphical representation of the relationship between the air-to-fuel mixture ratio and the resulting amount of CO.

According to the present invention, however, the air stream containing large amounts of high moisture is drawn by suction into the engine combustion chamber, so that the air-and-fuel mixture ratio can be increased to 1:19. The increase of the mixture ratio up to the above value not only decrease the quantities of HC and CO, but also causes a marked drop in the quantity of NOX. For example, FIG. 2 represents the curve of NOX varying with the varying air-and fuel mixture ratios, and it is clear from the curve that the mixture ratio of 1:19 reduces NOX to 1,400 ppm as compared with the theoretical mixture ratio. For increasing the air-and-fuel mixture ratio, a sufficient amount of humidity must be supplied to maintain the temperature within the combustion chambers to the minimum temperature requirements that can meet the combustion requirements for the complete burning that can take place when the mixture ratio is increased. In addition, the amount of air containing oxygen and hydrogen which are required for promoting the combustion under the above condition must be supplied from any other sources than the usual source from which the air-to-fuel mixture is supplied through the engine fuel intake pipe. According to the present invention, the combustion requirements under the higher air-and-fuel mixture ratio can be satisfied by causing an supplemental amount of the containing large amounts of high humidity to be supplied into the engine fuel intake pipe, by taking advantage of the suction that is developed in the intake pipe or engine. The supplemental air stream which is regulated to maintain the optimum mixture ratio contains very fine particles of water which are formed in the above described device. The high temperature within the engine helps fine particles of water in large quantities readily decompose into oxygen and hydrogen when they enter the high temperature combustion chamber. This provides the required amount of heat that supplements the loss caused by the heat consumption, and also supplies a sufficient amount of oxygen to enhance the complete combustion. It is clear that the complete combustion drastically reduces the quantities of HC and CO to be produced, and also reduces the quantity of NOX to be provided. Accordingly, the fuel consumption per Km can be reduced, thus improving the fuel economy. As the vapor-and-air stream to be supplied according to the present invention contains highly humid fine particles of water, it can effectively prevent the engine from producing abnormally high temperature exhaust gases.

In the above described embodiment, the water suction nozzle 3 should preferably have openings of a diameter of 0.3 mm or less, and the diameter in the range of 0.3 mm to 0.1 mm can meet the practical needs. The pipe 4 connecting between the water suction nozzle 3 and suction passage 7 and through which the water vapor is forced to flow by suction should have a diameter of the order of 1 mm and a length of between 25 mm and 35 mm. The diameter and length for the narrow water vapor-and-air pipe 9 should preferably be of the order of 2 mm and between 100 mm and 130 mm, respectively. The diameter and length for the connecting pipe 11 should preferably be of the order of 2 mm and 1,000 mm or less, respectively. The location in which the water container 1 is to be installed away from the engine installation in the car is determined by the above length of the connecting pipe 11, and therefore it should be located within the distance of 1,000 mm or less relative to the engine. The preceding test results show that 2,000 cc of water which is required for producing high-humidity air should be stored in the container 1 when the 2,000 cc engine car is running over a distance of 1,000 km.

The typical preferred embodiment of the present invention has fully been described, and as readily understood from the preceding description of the embodiment, the method according to the present invention provides an effective means of forming an air stream containing large amounts of high-humidity water vapor, which readily decomposes into oxygen and hydrogen when it enters the high-temperature combustion chamber. The formation of such vapor-and-air mixture stream is achieved by admitting water through the very fine apertures into the narrow vaporization pipe 4 by the action of the suction which is developed in the engine, thereby reducing the water flow into very fine particles; causing the flow of very fine particles of water to strike against the air stream at acute angles which is drawn by suction through its air feed pipe 14, thereby forming the vapor-and-air mixture and causing the mixture to flow at high speeds through the narrow suction pipe 9 and then through the connecting pipe into the engine fuel suction pipe. The major advantage of the method according to the present invention is in forming the vapor-and-air mixture that can contain extremely fine particles of water uniformly distributed in the air stream, thus enabling it readily to decompose into oxygen and hydrogen in the high-temperature ambient within the engine.

The apparatus according to the present invention can taken advantage of the same suction source that is developed in the engine, etc., in which the water and air suction passages or pipes are provided for meeting together at the particular point. The advantage of the apparatus is in allowing the vapor-and-air mixture to be formed during the flow of the vaporized water and air streams through the narrow suction pipe, which is connected through the intermediate connecting pipe into the fuel suction pipe. The engine suction source may be replaced by a vacuum pump.

Although the present invention has been described in conjunction with the preferred embodiment thereof, it should be understood that various changes and modifications may be made without departing from the spirit and scope of the invention.

What is claimed is:

1. A method of producing a highly humid stream of air, comprising:
   admitting water through a water entry point having very fine apertures of 0.3 mm or less diameter from a water supply source, by making use of the suction supplied by an external suction source;
   converting said admitted water into a vapor-state stream containing very fine particles of water;
   causing said vapor-state stream of water to meet at acute angles with a stream of air to be supplied from a air supply source by using the suction from said suction source;
   forming a uniform mixture consisting of said vapor-state stream water and said stream of air by causing said both streams to flow at high speeds through a narrow vapor-and-air mixture conduit, by using the suction from said suction source; and
   feeding said vapor-and-air mixture through a connecting conduit into said suction source or any other destination.

2. A method as defined in claim 1, wherein such of the apertures in the water entry point has a diameter in the range of 0.3 mm to 0.1 mm.

3. A method as defined in claim 1, wherein the suction provided by said suction source has a pressure range of 200 mm Hq to 700 mm Hq.

4. A method as defined in claim 1, wherein said water supply source contains water at a temperature range of 15° C. to 50° C.

5. An apparatus for producing a highly humid stream of air, comprising:
   a casing which contains a water supply source at appropriate temperature;
   water intake means including a nozzle having fine apertures at the bottom of said water supply source within said casing and operative under the action of the suction provided by an external suction supply source for allowing water to be admitted in a vapor state;
   a narrow water vaporization conduit operative by the suction of said suction supply source inside said casing, having one end thereof connected to the outlet of said water intake means;

a narrow air intake conduit operative by the suction of said suction supply source inside said casing, having one end thereof connected through regulator valve means to an external air supply source and having the other end thereof connected to the other end of said narrow water vaporization conduit, the connections between said air intake conduit and said water vaporization conduit being made at acute angles relative to each other; and a narrow vapor-and-air mixture conduit operative by the suction of said suction supply source inside said casing, having one end thereof connected to the connections of the air intake conduit and water vaporization conduit and having the other end thereof connected through an intermediate connecting pipe to said external suction source, whereby a vapor-and-air mixture formed at said connections is allowed by the suction to flow at high speeds into the suction source.

6. An apparatus as defined in claim 5, wherein said narrow vapor-and-air mixture conduit has a diameter of 2 mm or less with a cross-sectional area equal to double that of said narrow water vaporization conduit, and a length equal to double that of said water vaporization conduit.

7. An apparatus as defined in claim 5, wherein said external suction supply source is a vaccum pump or a fuel suction pipe from the automobile engine.

8. An apparatus as defined in claim 5, wherein said water vaporization conduit, said air intake conduit, and said vapor-and-air mixture conduit meet together by means of a focal element located in the center within said casing.

* * * * *